United States Patent
Ayachitula et al.

(10) Patent No.: US 12,547,849 B2
(45) Date of Patent: Feb. 10, 2026

(54) ABSTRACTIVE SUMMARIZATION OF INFORMATION TECHNOLOGY ISSUES USING A METHOD OF GENERATING COMPARATIVES

(71) Applicant: Kyndryl, Inc., New York, NY (US)

(72) Inventors: Naga A. Ayachitula, Dobbs Ferry, NY (US); Rohit Khandekar, Jersey City, NJ (US); Upendra Sharma, Hartsdale, NY (US)

(73) Assignee: Kyndryl, Inc., New York, NY (US)

( * ) Notice: Subject to any disclaimer, the term of this patent is extended or adjusted under 35 U.S.C. 154(b) by 234 days.

(21) Appl. No.: 18/447,506

(22) Filed: Aug. 10, 2023

(65) Prior Publication Data

US 2025/0053752 A1 Feb. 13, 2025

(51) Int. Cl.
G06F 40/40 (2020.01)
G06F 40/289 (2020.01)

(52) U.S. Cl.
CPC ........... G06F 40/40 (2020.01); G06F 40/289 (2020.01)

(58) Field of Classification Search
CPC ...... G06F 40/40; G06F 40/284; G06F 40/211; G16H 50/20
USPC .......................................................... 704/9
See application file for complete search history.

(56) References Cited

U.S. PATENT DOCUMENTS

| | | | | |
|---|---|---|---|---|
| 11,294,945 B2 * | 4/2022 | Kohita | | G06F 40/284 |
| 12,301,756 B1 * | 5/2025 | Olejar, Jr. | | H04M 3/5116 |
| 2012/0296845 A1 * | 11/2012 | Andrews | | G06Q 40/06 |
| | | | | 705/36 R |
| 2017/0161372 A1 * | 6/2017 | Fernández | | G06F 40/211 |
| 2018/0025303 A1 * | 1/2018 | Janz | | G16H 50/20 |
| | | | | 705/2 |
| 2024/0412048 A1 * | 12/2024 | Knudson | | G06F 40/40 |

FOREIGN PATENT DOCUMENTS

WO WO-2023285688 A1 * 1/2023 ........... G06F 40/284

OTHER PUBLICATIONS

Zhang et al. "Neural Models of Text Normalization for Speech Applications" (Year: 2019).*
Dedhia et al. "Study on Abstractive Text Summarization Techniques" (Year: 2020).*
Shah et al. "Text Summarization using extractive and abstractive Techniques" Jun. 2022 (Year: 2202).*
Eriksson et al. "NPL-Assisted workflow improving bug ticket handling" (Year: 2021).*

(Continued)

*Primary Examiner* — Richemond Dorvil
(74) *Attorney, Agent, or Firm* — CANTOR COLBURN LLP; John Kennel

(57) ABSTRACT

Embodiments relate to providing automated text summarization techniques for capturing and conveying information technology (IT) records with numerical data. A technique is executed by one or more processors and includes receiving an IT record comprising text and numerical data, normalizing the numerical data into normalized numerical data, transforming the normalized numerical data into comparative and superlative adjectival terms and rewriting the text to include the comparative and superlative adjectival terms for output as a rewritten IT record.

21 Claims, 8 Drawing Sheets

(56) References Cited

OTHER PUBLICATIONS

Tissot et al. "Normalisation of imprecise temporal expressions extracted from text" (Year: 2017).*
Javaloy et al "Text normalization using encoder-decoder networks based on the causal feature extractor" (Year: 2020).*
A review on abstractive text summarization methods. (Year: 2022).*
Eriksson et al., "NLP-Assisted Workflow Improving Bug Ticket Handling", URL: https://www.diva-portal.org/smash/get/diva2:1591483/FULLTEXT01.PDF, Retrieved: Mar. 19, 2024, 17 pages.
International Search Report and Written Opinion; Date of Mailing: Apr. 5, 2024; Application No. PCT/EP2023/079771; Filed: Oct. 25, 2023; 14 pages.

* cited by examiner

ABSTRACTIVE SUMMARIZATION OF INFORMATION TECHNOLOGY ISSUES USING A METHOD OF GENERATING COMPARATIVES

BACKGROUND

The present invention generally relates to computer systems, and more specifically, to computer-implemented methods, computer systems, and computer program products configured and arranged to provide abstractive summarization of information technology issues using a method of generating comparatives.

An information technology (IT) ticketing system is a tool used to track IT service requests, events, incidents, and alerts that might require additional action from the IT department. Ticketing software allows organizations to resolve their internal IT issues by streamlining the resolution process. The elements they manage, called tickets, provide context about the issues, including details, categories, and any relevant tags.

The ticket often contains additional contextual details and may also include relevant contact information of the individual who created the ticket. Tickets are usually employee-generated, but automated tickets may also be created when specific incidents occur and are flagged. Once a ticket is created, it is assigned to an IT agent to be resolved. Effective ticketing systems allow tickets to be submitted via a variety of methods. These include submissions through virtual agents, phone, email, service portals, live agents, walk-up experience, etc.

In general, automation systems automate aspects of the environment and problem resolution, event monitoring software monitors components and the environment, and incidents are reported via tickets through the ticketing system. A typical system may use natural language to monitor a ticket and output, via general language classifiers, what the problem that is reflected in the ticket. Such a system could make use of automated text summarization techniques. Automated text summarization techniques create a shortened text from a larger document or from a collection of many tickets with the goal of accurately capturing and conveying the most important and relevant information. There are several automated text summarization techniques, each with advantages and disadvantages. Typically, disadvantages of automated text summarization techniques lie in the fact that they are unable to deal with numerical data in a meaningful way. This is a major problem in compiling IT operational data because IT operational data often includes numerical quantities. Unfortunately, there are no known solutions for abstract summarization of IT operational data due to the descriptions of IT issues being provided in numerical quantities.

What is needed is a system that provides abstract summarizations of IT operational data where the IT operational data describes IT issues in numerical quantities.

SUMMARY

Embodiments of the present invention are directed to a computer-implemented method for automated abstractive information technology (IT) summary generation. A non-limiting example of the computer-implemented method includes receiving an IT record comprising text and numerical data, normalizing the numerical data into normalized numerical data, transforming the normalized numerical data into comparative and superlative adjectival terms and rewriting the text to include the comparative and superlative adjectival terms for output as a rewritten IT record.

This can provide an improvement over known methods for automated text summarization by providing automated text summarization techniques for capturing and conveying information technology (IT) records with numerical data.

In addition to one or more of the features described above or below, the computer-implemented method further includes performing sentiment analysis on the text of the IT record and the rewriting of the text includes accounting for results of the sentiment analysis.

In addition to one or more of the features described above or below, the performing of the sentiment analysis includes preprocessing of the text into tokenized text by removing irrelevant information, special characters and stopwords, analyzing the tokenized text to determine a sentiment associated with each phrase in the tokenized text and aggregating the sentiment associated with each phrase in the tokenized text to determine an overall sentiment of the text.

In addition to one or more of the features described above or below, the computer-implemented method further includes performing a coreference resolution with respect to the rewritten IT record to generate a summary report to be output.

In addition to one or more of the features described above or below, the performing of the coreference resolution includes identifying and linking phrases in the rewritten IT record referring to a same entity and the summary report includes indications of phrases in the rewritten IT record referring to the same entity.

In addition to one or more of the features described above or below, the one or more processors use at least one of artificial intelligence (AI) and machine learning (ML) to execute at least the normalizing, the transforming, the performing of the sentiment analysis, the rewriting and the performing of the coreference resolution.

In addition to one or more of the features described above or below, the normalizing includes min-max scaling, z-score standardization and decimal scaling.

In addition to one or more of the features described above or below, the transforming includes threshold-based comparing, relative comparing and mapping to predefined categories.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
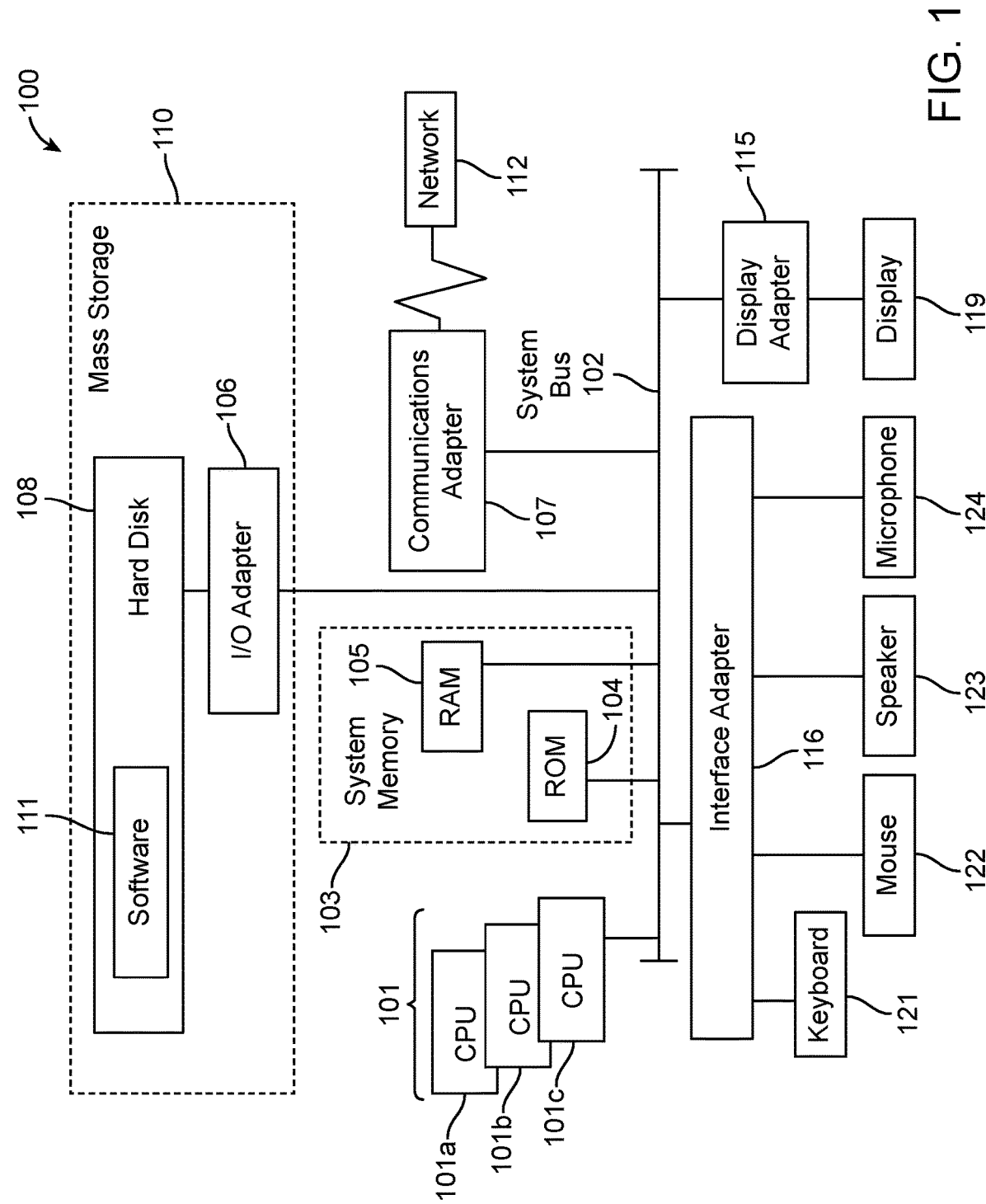
FIG. 1 depicts a block diagram of an example computer system for use in conjunction with one or more embodiments of the present invention.

One or more embodiments provide for automated abstractive information technology (IT) summary generation, a method for abstractive summarization of overall IT assessment and posture and a method for translation of recommendations using comparative adjectives/superlatives using a scoring engine to determine sentiment, priority, importance, etc. The automated abstractive IT summary generation can summarize information of IT tickets numbering in the hundreds, thousands, millions or more. The automated abstractive IT summary generation provides for a client IT estate summary, an explanation of key operational issues, comparisons with industry, similar clients and with a client's own history and a future outlook and improvements. The automated abstractive IT summary generation includes a scoring engine that determines correct comparative terms, that rewrites text by translating the text into those comparative terms and that generates an abstract summarization text using AI/ML models.

Incident identification and automated resolution is the process of managing IT service disruptions and restoring services. For example, a monitoring system monitors the IT environment of a client in an industry. The term "IT environment" refers to the infrastructure, hardware, software and systems that a client (entity or business) relies on every day in the course of using IT. Some of the commonly used resources in an IT environment include computers, internet access, peripheral devices, etc. Examples in the IT environment may include the following: hardware: routers, personal computers, servers, switches and data centers; software: user applications, web servers and applications that make hardware connections effective and useable; and networking: firewalls, cables and other components that facilitate internal and external communication in a business. Upon detection of a technical event in the IT environment and/or upon the request of a user of the IT environment, the monitoring system generates a ticket. The ticket can be sent to an automated resolution system and/or the IT department to be resolved. A ticket is a special document or record that represents an incident, alert, request and/or event that requires action from the IT department. Also, a ticket is an historical document that details a service event, such as an incident, problem and/or service request. Tickets govern and control how a service event is processed.

A typical system may monitor an IT environment and attempt to identify the problem associated with a given ticket. However, while general language classifiers handle text well, they do not handle numerical data well.

Technical solutions and benefits include a system for automated abstractive IT summary generation according to one or more embodiments. This provides for automated text summarization techniques for capturing and conveying IT records with numerical data.

One or more embodiments described herein can utilize machine learning techniques to perform tasks, such as classifying a feature of interest. More specifically, one or more embodiments described herein can incorporate and utilize rule-based decision making and artificial intelligence (AI) and/or machine learning (ML) reasoning to accomplish the various operations described herein, namely automated abstractive IT summary generation. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example.

Turning now to FIG. 1, a computer system 100 is generally shown in accordance with one or more embodiments of the invention. The computer system 100 can be an electronic, computer framework including and/or employing any number and combination of computing devices and networks utilizing various communication technologies, as described herein. The computer system 100 can be easily scalable, extensible and modular, with the ability to change to different services or reconfigure some features independently of others. The computer system 100 may be, for example, a server, desktop computer, laptop computer, tablet computer or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
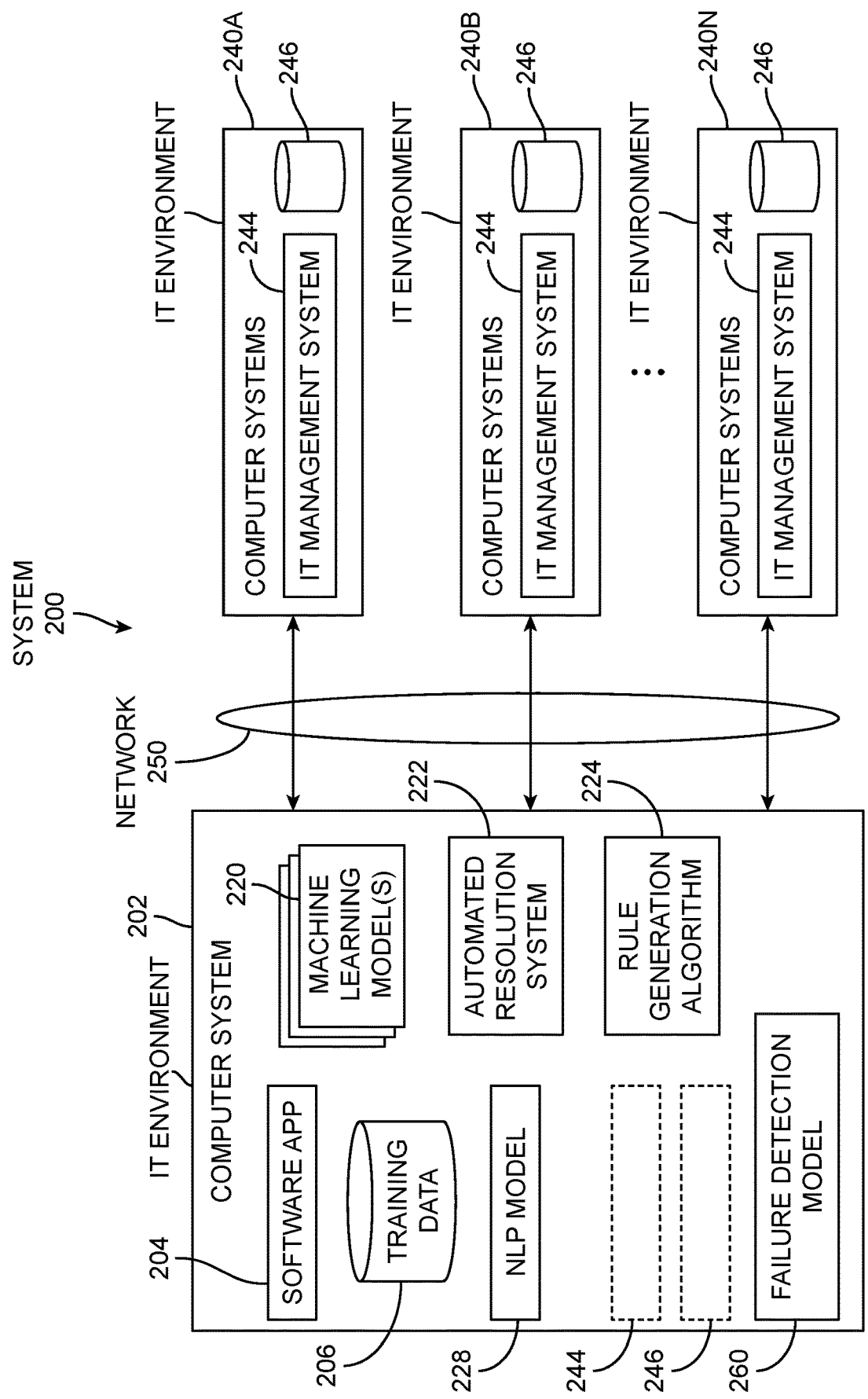
FIG. 2 depicts a block diagram of an example system configured to provide automated text summarization techniques for capturing and conveying information technology (IT) records with numerical data according to one or more embodiments of the present invention.

FIG. 2 depicts a block diagram of an example system 200 configured to provide automated abstractive IT summary generation. The system 200 includes a computer system 202 configured to communicate over a network 250 with many different computer systems, such as a computer system 240A for managing the IT environment for one client in one industry, a computer system 240B for managing the IT environment for another client in another industry, through a computer system 240N for managing the IT environment for yet another client of different industry. The computer systems 240A, 240B, through 240N can generally be referred to as computer systems 240. Each of the computer systems 240 has its own IT management system 244 for monitoring the IT environment for the respective clients of their respective industries and storing their respective tickets and resolutions in ticket repositories 246. The ticket repositories 246 are operable to store a large number of tickets and their respective resolutions for the IT environments of the computer systems 240. The network 250 can be a wired or wireless communication network.

The IT management system 244 may include or be representative of a monitoring and ticketing system and an automated resolution system for each client in the industry. By the software application 204 communicating over the network 250, which can be a wired or wireless communication network, with the computer systems 240, the software application 204 is configured to extract various tickets and their respective resolutions in the ticket repositories 246 from different clients in different industries.

In one or more embodiments, as illustrated with dashed lines, the computer system 202 may include respective IT management systems 244 and their ticket repositories 246 for one or more computer systems 240A-240N in their respective IT environments of clients. The computer system 202 can manage the IT environments of the clients for one or more computer systems 240A-240N. Any portion of the system 200 including the computer system 202 and one or more of the computer systems 240A-240N can be part of a cloud computing environment 50 (depicted in FIG. 8) as discussed further herein.

In system 200, the computer system 202, the computer systems 240A-240N, the IT management systems 244, the software application 204, training data 206, machine learning models 220, automated resolution system 222, rule generation algorithm 224, etc., can include and/or use any of the functionality discussed in computer system 100 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software application 204 may be representative of numerous software applications.

The tickets and their respective resolutions are stored in repositories, such as storages, as training data 206. The software application 204 filters the training data 206 to ensure that the training data 206 is only in the IT environment, which can also be referred to as the IT domain or IT space. The IT domain encompasses the IT environments of the clients in respective industries. Any tickets that are not related to events (e.g., errors, issues, security breaches, malfunctioning computer equipment, etc.) in the IT domain are removed from the training data 206.

The computer system 202 includes a machine learning model 220, which is a client agnostic machine learning model that has been trained to provide automated abstractive IT summary generation.

In one or more embodiments, the machine learning model 220, rule generation algorithm 224, and/or NLP model 228 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., a ticket of a technical computer problem) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection between a pre-neuron and a post-neuron, thus representing the connection weight. The connection represents, for example, a synapse between a pre-neuron and a post-neuron. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206) can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

Figure 3:
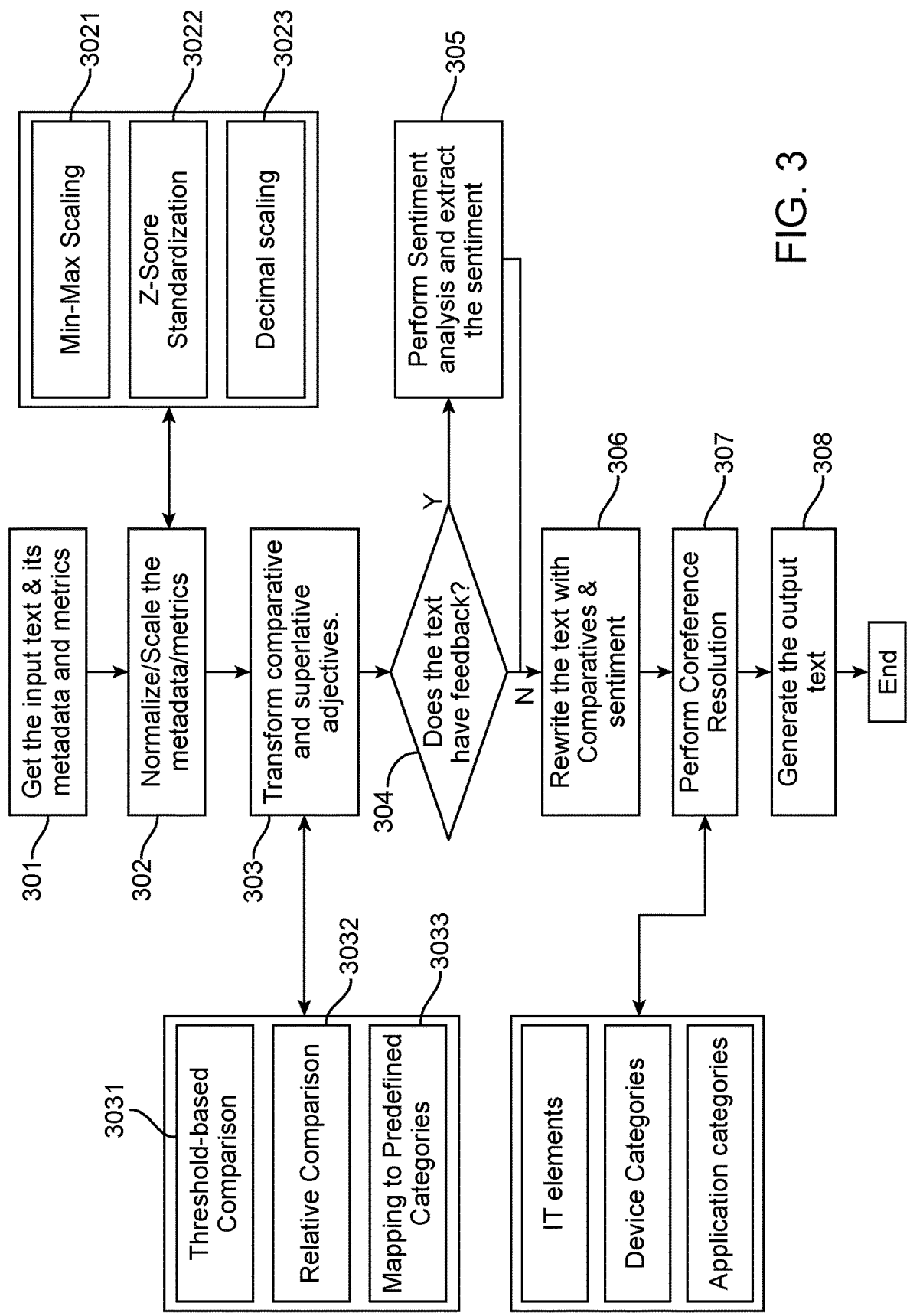
FIG. 3 is a flowchart of a computer-implemented method for automated text summarization techniques for capturing and conveying information technology (IT) records with numerical data according to one or more embodiments of the present invention.

FIG. 3 is a flowchart of a computer-implemented method 300 for automated abstractive IT summary generation according to one or more embodiments. The computer-implemented method 300 can be executed by one or more processors of the computer system 202.

As shown in FIG. 3, the computer-implemented method 300 includes receiving an IT record (block 301). The IT record can be an IT ticket that may be one of numerous other IT tickets (e.g., hundreds, thousands, millions, etc.), which are also received. The IT record includes text and numerical data. The text can include a description of an IT issue, predictions relating to the IT issue and recommended actions to take relating to the IT issue. The numerical data include numerical information relating to the IT issue, such as how many times the IT issue has been observed, how many times the predictions have come true and how often the recommended actions are effective or ineffective in correcting or mitigating the IT issue. The computer-implemented method 300 further includes normalizing the numerical data into normalized numerical data (block 302), transforming the normalized numerical data into comparative and superlative adjectival terms (block 303), determining whether the text of the IT record includes feedback or sentiment (block 304) and, in an event the determining of block 304 indicates that the text includes the feedback or sentiment, performing sentiment analysis on the text (block 305). The normalizing of the numerical data of block 302 can include min-max scaling (block 3021), z-score standardization (block 3022) and decimal scaling (block 3023). The transforming of the normalized numerical data of block 303 can include threshold-based comparing (block 3031), relative comparing (block 3032) and mapping to predefined categories (block 3033). The computer-implemented method 300 also includes rewriting the text to include the comparative and superlative adjectival terms for output as a rewritten IT record (block 306), where the rewriting of the text of block 306 includes accounting for results of the sentiment analysis of block 305 (block 3061), performing a coreference resolution with respect to the rewritten IT record considering IT elements, device categories and application categories to generate a summary report to be output (block 307) and outputting the summary report (block 308).

Figures 4, 5:
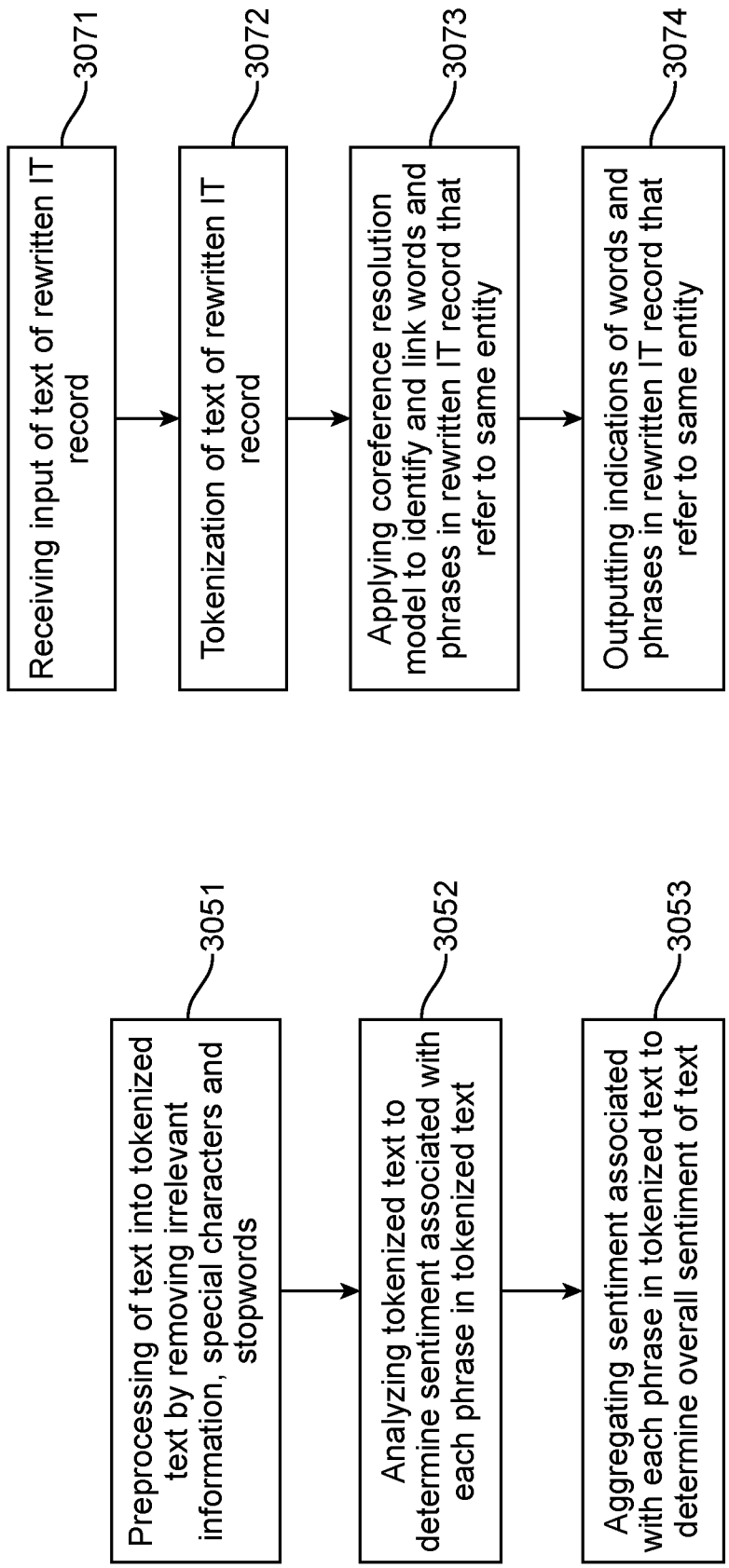
FIG. 4 is a flowchart illustrating sentiment analysis of the computer-implemented method of FIG. 3 according to one or more embodiments of the present invention.
FIG. 5 is a flowchart illustrating coreference resolution of the computer-implemented method of FIG. 3 according to one or more embodiments of the present invention.

With reference to FIG. 4, the performing of the sentiment analysis of block 305 can include preprocessing of the text into tokenized text by removing irrelevant information, special characters and stopwords (block 3051), analyzing the tokenized text to determine a sentiment associated with each phrase in the tokenized text (block 3052) and aggregating the sentiment associated with each phrase in the tokenized text to determine an overall sentiment of the text (block 3053).

With reference to FIG. 5, the performing of the coreference resolution of block 307 includes receiving an input of the text of the rewritten IT record (block 3071), tokenization of the text of the rewritten IT record (block 3072), applying a coreference resolution model to identify and link words and phrases in the rewritten IT record that refer to a same entity (block 3073) and outputting indications of the words and phrases in the rewritten IT record that refer to the same entity (block 3074) so that the summary report can include those indications.

For the normalizing of the numerical data of block 302, normalization is the process of transforming numerical values to a common scale or range while allowing for meaningful comparisons and analysis. In normalization by min-max scaling, values are scaled to a fixed range, typically between 0 and 1 and a scaled_value=(value−min_value)/(max_value−min_value). This ensures that the minimum value in the dataset is mapped to 0, and the maximum value is mapped to 1, while preserving the relative differences between other values. In normalization by z-score standardization, z-score standardization transforms values by subtracting the mean and dividing by the standard deviation and z-score=(value−mean)/standard_deviation. This technique ensures that the standardized values have a mean of 0 and a standard deviation of 1 and allows for comparisons based on the number of standard deviations a value is away from the mean. In normalization by decimal scaling, decimal scaling involves shifting decimal point of values to create new scaled values. The scaling factor is determined by the largest absolute value among the dataset and a scaled_value=value/(10^scaling_factor). This technique results in values with a reduced range, making them easier to compare. The above techniques can be applied to various types of numeric data, such as continuous variables, counts, percentages, or any other form of numerical representation. By normalizing or scaling the numeric data, it is possible to ensure that the values are transformed into a comparable range, allowing for meaningful comparative analysis.

Given that there can be hundreds if not thousands or millions of predictions in an overall IT environment, each scaling method has its advantages and is suitable for different scenarios. Min-max scaling tends to be used when it is desired to maintain relative relationships between values and bring them within a specific range. It is commonly used where required values are in a specific range. Z-score standardization tends to be used when it is desired to standardize values based on their deviation from the mean. It allows for comparison based on the number of standard deviations a value is away from the mean and is commonly used for statistical analyses and outlier detection. Decimal scaling tends to be used when it is desired to reduce the range of values by shifting the decimal point, making them more manageable. It is used when working with very large or small numbers, where the scaling factor can be adjusted to achieve the desired precision. The choice of scaling method(s) depends on the specific data predictions and recommendations and a desired analysis type.

For the transforming of the normalized numerical data into comparative and superlative adjectival terms of block 303, normalized or scaled values are leveraged to create comparative or superlative descriptions. Threshold-based comparisons set thresholds or ranges based on the normalized or scaled values and assign comparative or superlative adjectives accordingly. For example, one could define a range where values above a certain threshold are considered "high" or "great," while values below another threshold are labeled as "low" or "poor." Relative comparisons compare the normalized or scaled values with a reference point or benchmark. One could use adjectives like "higher" or "lower" to indicate a relative comparison to the reference point. For example, if a value is higher than the average or median, one could describe it as "above average" or "higher than usual." Mappings to predefined categories map the normalized or scaled values to predefined categories or adjective levels. For example, one could define categories like "low," "medium," and "high" or adjective levels like "low," "moderate," and "high" and, based on the normalized value, assign the corresponding category or adjective level. In addition, mappings allow for creation of linguistic rules and use predefined word lists to map the numerical ranges to appropriate comparative or superlative adjectives. For instance, one can define rules to assign adjectives like "larger," "largest," "smaller," or "smallest" based on specific ranges or thresholds. These approaches all involve subjective decisions on the IT domain-specific knowledge or context and choices of comparative and superlative adjectives will depend on specific use cases, data and a desired interpretation of the scaled or normalized values. Translating normalized or scaled data into comparative and superlative adjectives can also involve the utilization of underlying information and apply contextual rules or thresholds to create descriptive comparisons.

For the sentiment analysis of block 305, sentiment analysis is a technique used to determine a sentiment or an emotional tone expressed in a piece of text, typically classified as positive, negative or neutral. Sentiment analysis can be applied as follows:

Step 1: Input Text
Consider the following sentence as input text:
"I absolutely agreed with the predictions. The predictions were accurate, and the actions kept me engaged everyday."
Step 2: Preprocessing
Preprocess the text by removing any irrelevant information, special characters or stopwords. Tokenize the text into individual words, if necessary, to yield the following exemplary tokens:
["I", "absolutely", "agreed", "the", "predictions", ".", "The", "predictions", "were", "accurate", ",", "and", "the", "actions", "kept", "me", "engaged", "everyday", "."]
Step 3: Sentiment Analysis
The sentiment analysis model analyzes the tokens and determines the sentiment associated with each word or phrase. An example of sentiment classification for each token can be:
["I", "absolutely", "agreed", "the", "predictions", ".", "The", "predictions", "were", "accurate", ",", "and", "the", "actions", "kept", "me", "engaged", "everyday", "."]
["O", "positive", "positive", "O", "positive", "O", "O", "positive", "positive", "positive", "O", "positive", "O", "positive", "positive", "positive", "positive", "positive", "O"]

Step 4: Aggregate Sentiment
The sentiment labels are aggregated to determine an overall sentiment of the text. Common approaches include taking the majority sentiment or calculating a sentiment score based on the distribution of sentiments. If it is assumed that the majority sentiment approach is used in this example, a positive sentiment for the input text would result.
Step 5: Sentiment Output
The output of sentiment analysis for the input text is determined as positive based on, for example, having the majority sentiment. A negative sentiment can be determined when the majority sentiment is negative.

For the performing of the coreference resolution with respect to the rewritten IT record considering IT elements, device categories and application categories to generate a summary report to be output of block 307, IT elements, devices and applications are subjected to coreference resolution processing, which is a natural language processing technique that can be used to identify and link expressions in text that refer to the same entity. Coreference resolution can be applied as follows:
Step 1: Input Text
Consider the following sentences as input text: "Lisa is a talented programmer. She has released several products."
Step 2: Tokenization
Tokenize the text into individual words: ["Lisa", "is", "a", "talented", "programmer", ".", "She", "has", "released", "several", "products", "."]
Step 3: Coreference Resolution
Apply a coreference resolution model, such as a natural language processing model, to identify and link the expressions referring to the same entity. In this case, the model recognizes that "Lisa" and "She" refer to the same person.
Step 4: Coreference Output
The output of coreference resolution provides the linked mentions, indicating which expressions refer to the same entity:
["Lisa", "is", "a", "talented", "programmer", ".", "Lisa", "has", "released", "several", "products", "."]
Step 5: Processing
Once coreference resolution is applied, the output can be used for various purposes including, but not limited to, information consolidation, text understanding and text generation. As to information consolidation, by linking all mentions of the same entity, coreference resolution allows for the aggregation of information and for the creation of a more coherent representation of the text. As to text understanding, coreference resolution helps one to understand the relationships between different entities and their roles in the text. As to text generation, an output of coreference resolution can be used to generate text that maintains the appropriate references to entities and avoids redundancy. Coreference resolution is particularly beneficial when dealing with texts that involve multiple mentions of the same entity. It helps to eliminate ambiguity and improve the overall understanding and coherence of the text.

In accordance with one or more embodiments of the present invention, the one or more processors executing the computer-implemented method 300 can use artificial intelligence (AI) and/or machine learning (ML) to execute at least the normalizing of the numerical data of block 302, the transforming of the normalized numerical data of block 303, the performing of the sentiment analysis of block 305, the rewriting of the text to include the comparative and superlative adjectival terms for output as a rewritten IT record of block 306 and the performing of the coreference resolution of block 307.

Figure 6:
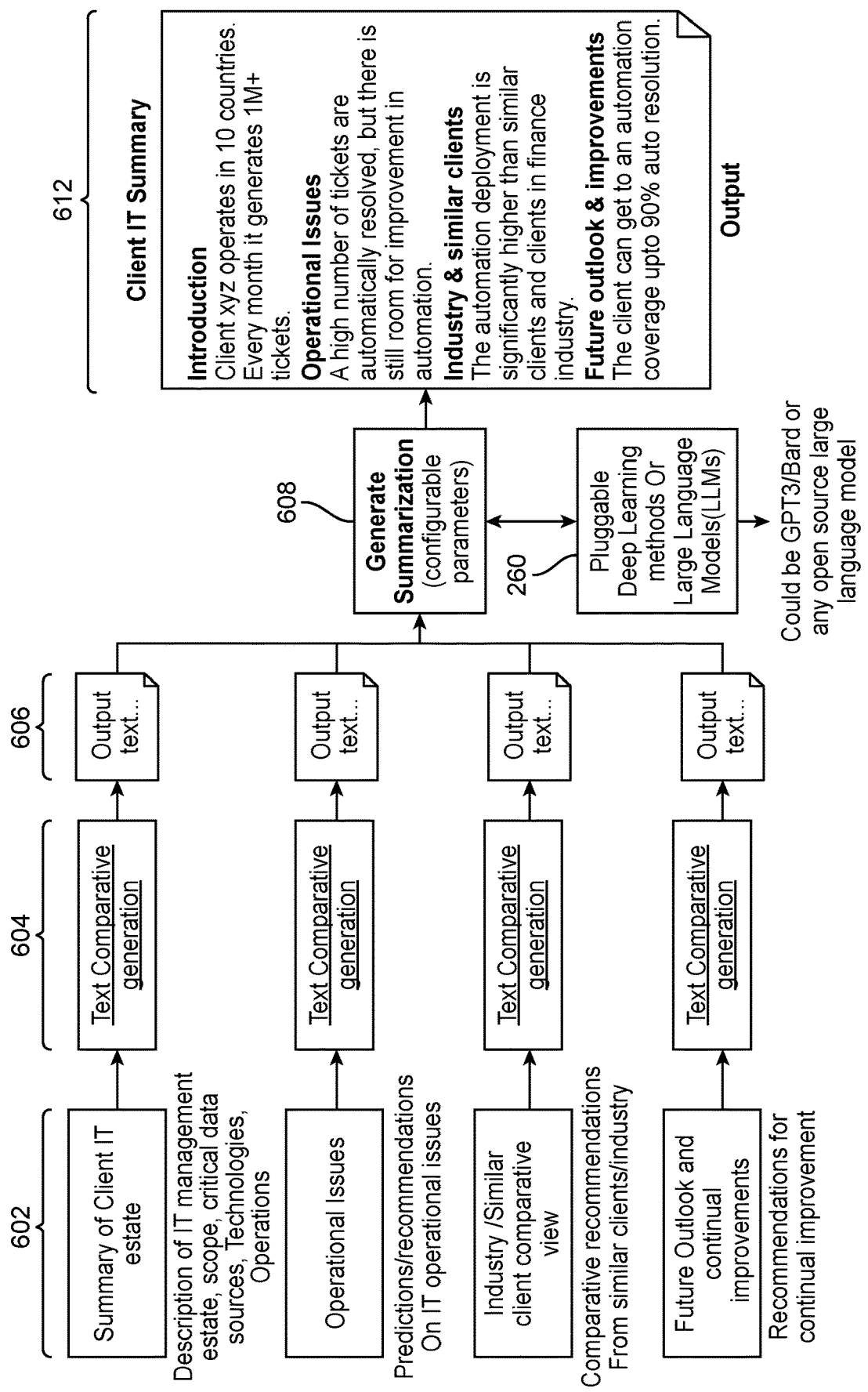
FIG. 6 is a graphical display of generation of an IT summary through text comparative generation according to one or more embodiments of the present invention.
Figure 7:
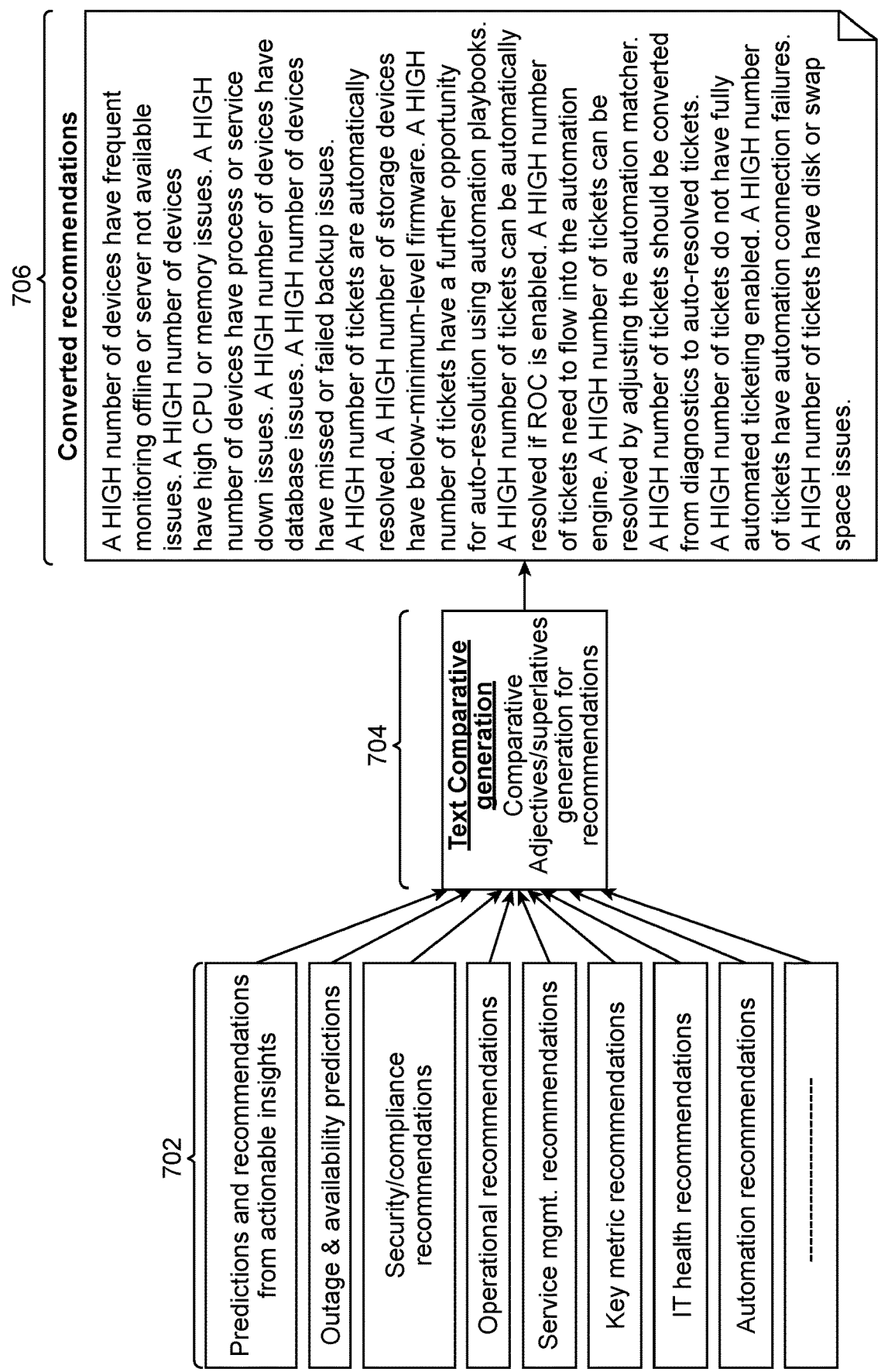
FIG. 7 is a graphical display of text comparative generation of FIG. 6 according to one or more embodiments of the present invention.

With continued reference to FIGS. 3-5 and with additional reference to FIGS. 6 and 7, an exemplary case of the transforming of the normalized numerical data into comparative and superlative adjectival terms of block 303, the rewriting of the text to include the comparative and superlative adjectival terms for output as a rewritten IT record of block 306 and the outputting of the summary report of block 308 is shown schematically.

As used herein, the training data will contain rule expressions and thresholds with relevant adjectives and superlatives as described above.

The following is an example of training data that can be used for learning/training. Note that the scenarios below are only a few rules used to describe examples/scenarios. A full set of training data/model would include all (hundreds if not more) the rules and rule expressions.

Scenario 1: Example training data with metadata/rules and associated adjectives/superlatives:
  Training data text (including Input Text in red)
  Rules to interpret the number of tickets:
    number of tickets is less than 6 is extremely small
    number of tickets <10 is very small
    number of tickets <90 is small
    90<number of tickets<110 is median
    number of tickets >110 is large
    number of tickets >1000 is very large
    number of tickets >10000 is extremely large
  Rules to interpret the resolution time:
    resolution time <0.5 sec is extremely small
    0.5<resolution time <10 sec is very small
    10<resolution time <50 sec is small
    50<resolution time <100 sec is median
    100<resolution time <1000 sec is large
    1000 sec <resolution time is very large
  For instance, the interpretations of sentences are shown below
    Sentence: Around 500 tickets have a resolution time of around 0.75 sec.
    Interpretation: Large number of tickets have an extremely small resolution time.
    Sentence: Around 100 tickets have a resolution time of around 200 sec.
    Interpretation: Median number of tickets have a large resolution time.
  Firstly, use the above-mentioned ranges of resolution time as well as number of tickets
  to generate an interpretation of the text delimited by triple backticks.
  Finally, summarize the interpreted text without numbers
  . . .
  Input: Top devices with disk and swap issues account for 200 tickets
  . . .
  Output text:
A large number of tickets are associated with disk and swap issues.
Scenario 2: Example training data with metadata/rules and associated adjectives/superlatives and un-interpretable numbers:
  Training data text (including Input Text in red):
  Rules to interpret the number of tickets:
    number of tickets is less than 6 is extremely small
    number of tickets <10 is very small
    number of tickets <90 is small
    90<number of tickets <110 is median number of tickets >110 is large
number of tickets >1000 is very large
number of tickets >10000 is extremely large
Rules to interpret the resolution time:
resolution time <0.5 sec is extremely small
0.5<resolution time <10 sec is very small
10<resolution time <50 sec is small
50<resolution time <100 sec is median
100<resolution time <1000 sec is large
1000 sec <resolution time is very large
For instance, the interpretations of sentences are shown below
Sentence: Around 500 tickets have a resolution time of around 0.75 sec.
Interpretation: Large number of tickets have an extremely small resolution time.
Sentence: Around 100 tickets have a resolution time of around 200 sec.
Interpretation: Median number of tickets have a large resolution time.
Firstly, use the above-mentioned ranges of resolution time as well as number of tickets
to generate an interpretation of the text delimited by triple backticks.
Finally, summarize the interpretated text without numbers
. . .
Input: For the client ABC we have observed that 500 tickets have an approximate resolution time of around 0.5 sec while 120 tickets have an approximate resolution time of around 40 sec while for around 40 tickets the resolution time is over 200 sec. 4 of ABC's tickets had resolution time greater than 3600 sec
. . .
Output:
A large number of tickets for client ABC have an extremely small resolution time, while a smaller number of tickets have a small resolution time. There are also a few tickets with a large resolution time.
Scenario 3: Summarizing a table of rules:
Training data text (including Input table in red):
Rules to interpret the number of tickets:
number of tickets is less than 6 is extremely small
number of tickets <10 is very small
number of tickets <90 is small
90<number of tickets <110 is median
number of tickets >110 is large
number of tickets >1000 is very large
number of tickets >10000 is extremely large
Rules to interpret the resolution time:
resolution time <0.5 sec is extremely small
0.5<resolution time <10 sec is very small
10<resolution time <50 sec is small
50<resolution time <100 sec is median
100<resolution time <1000 sec is large
1000 sec <resolution time is very large
For instance, the interpretations of sentences are shown below:
Sentence: Around 500 tickets have a resolution time of around 0.75 sec.
Interpretation: Large number of tickets have an extremely small resolution time.
Sentence: Around 100 tickets have a resolution time of around 200 sec.
Interpretation: Median number of tickets have a large resolution time.
Firstly, use the ranges mentioned above of resolution time as well as number of tickets
to generate an interpretation text for each row of the table delimited by triple backticks.
Finally, summarize all of the interpreted text in 40 words without numbers.

```
Input:
| Resolution Time (sec) | Number of Tickets |
|-----------------------|-------------------|
| 0.25                  | 1000              |
| 200                   | 40                |
| 3600                  | 5                 |
```

Output:
The first row indicates a very large number of tickets with an extremely small resolution time. The second row suggests a small number of tickets with a large resolution time. The third row shows an extremely small number of tickets with a very large resolution time. Overall, the data represents a wide range of ticket quantities and resolution times.
Another example output:
Here's the per row summary:

| Resolution Time (sec) | Number of Tickets | Summary |
|---|---|---|
| 0.25 | 1000 | Extremely small resolution time, very large number of tickets |
| 200 | 40 | Very small resolution time, small number of tickets |
| 3600 | 5 | Extremely large resolution time, extremely small number of tickets |

The table shows a range of resolution times and number of tickets. The first row has an extremely small resolution time and a very large number of tickets, while the second row has a very small resolution time and a small number of tickets. The third row has an extremely large resolution time and an extremely small number of tickets.

As shown in FIG. 6, an IT record 602 might include a summary of a client IT estate (i.e., a description of an IT management estate, a scope, critical data sources, technologies, operations, etc.), a collection of operational issues (i.e., predictions/recommendations on IT operational issues), industry/similar client comparative views (i.e., comparative recommendations from similar clients/industry) and future outlook and recommendations for continual improvements. In such cases, the rewriting of the text of block 306 can involve text comparative generation 604 and the resulting output text 606 can be combined into a summary using, e.g., AI/ML 260 (see FIG. 2). A summarization 608 can be generated with configurable parameters.

Many large language models (LLMs) are available off-the-shelf and can be plugged in as a black box. These are models that can understand language and can generate summarized text. Some examples include GPT-3 and GPT-4 from OpenAI, LLaMA (Large Language Model Meta AI) from Meta, and PaLM2 (Pathways Language Model) from Google. Hugging Face's BLOOM (BigScience Large Open-science Open-access Multilingual) Language Model, Meta AI's Llama (Large Language Model Meta Artificial Intelligence), ESMFold, or Evolutionary Scale Modeling, NVIDIA & Microsoft's MT-NLG-Megatron-Turing Natural Language Generation, or MT-NLG, monolithic transformer-based language model, Google's LaMDA (Language Model for Dialogue Applications) model are all some examples of LLMs that can be plugged-in as a black box.

The resulting output texts are all collated into a large text that needs to be summarized by any available LLM. The following is an example of before and after summarization using OpenAI GPT-3.

Text before summarization:

Top automation playbooks with further opportunities in resolving tickets account for many tickets. Top devices with the most auto-resolved incident tickets account for a few tickets. Top automation playbooks resolving incident tickets account for many tickets. Top business applications with the most incident tickets account for many tickets. Top office locations of devices with the most incidents account for many tickets. Top devices, with monitoring frequently offline or unavailable servers, account for a few tickets. Top devices with the highest CPU or memory-related incident tickets account for a few tickets. Top devices, with the most database issues, account for a few tickets. Top devices with the most frequent process or service down account for a few tickets. The top devices with the most missed or failed backups account for a few tickets. Top devices with the most disk or swap space-related incident tickets account for very few tickets. Top devices with the most incident tickets account for many tickets. The top change groups, with the most change tickets, account for a few.

Text after summarization by OpenAI GPT-3 within 100 words:

Many tickets are accounted for by the top automation playbooks with further opportunities in resolving tickets, top devices with the most auto-resolved incident tickets, top business applications with the most incident tickets, and top devices with the most incident tickets. A few tickets are accounted for by top office locations of devices with the most incidents, top devices with monitoring frequently offline or unavailable servers, top devices with the highest CPU or memory-related incident tickets, and top devices with the most database issues.

The summary is then output as a client IT summary 612 including an introduction (e.g., client xyz operates in 10 countries, every month it generates 1M+ tickets), operational issues (e.g., a high number of tickets are automatically resolved, but there is still room for improvement in automation), a review of industry and similar clients (e.g., the automation deployment is significantly higher than similar clients and clients in finance industry) and a review of future outlook and improvements (e.g., the client can get to an automation coverage up to 90% auto resolution).

As shown in FIG. 7, the text comparative generation can use, as inputs 702, predictions and recommendations from actionable insights, outage and availability predictions, security/compliance recommendations, operational recommendations, service management recommendations, key metric recommendations, IT health recommendations and automation recommendations. The text comparative generation 704 can then output converted text 706, such as the following:

"HIGH number of devices have frequent monitoring offline or server not available issues. A HIGH number of devices have high CPU or memory issues. A HIGH number of devices have process or service down issues. A HIGH number of devices have database issues. A HIGH number of devices have missed or failed backup issues. A HIGH number of tickets are automatically resolved. A HIGH number of storage devices have below-minimum-level firmware. A HIGH number of tickets have a further opportunity for auto-resolution using automation playbooks. A HIGH number of tickets can be automatically resolved if ROC is enabled. A HIGH number of tickets need to flow into the automation engine. A HIGH number of tickets can be resolved by adjusting the automation matcher. A HIGH number of tickets should be converted from diagnostics to auto-resolved tickets. A HIGH number of tickets do not have fully automated ticketing enabled. A HIGH number of tickets have automation connection failures. A HIGH number of tickets have disk or swap space issues."

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
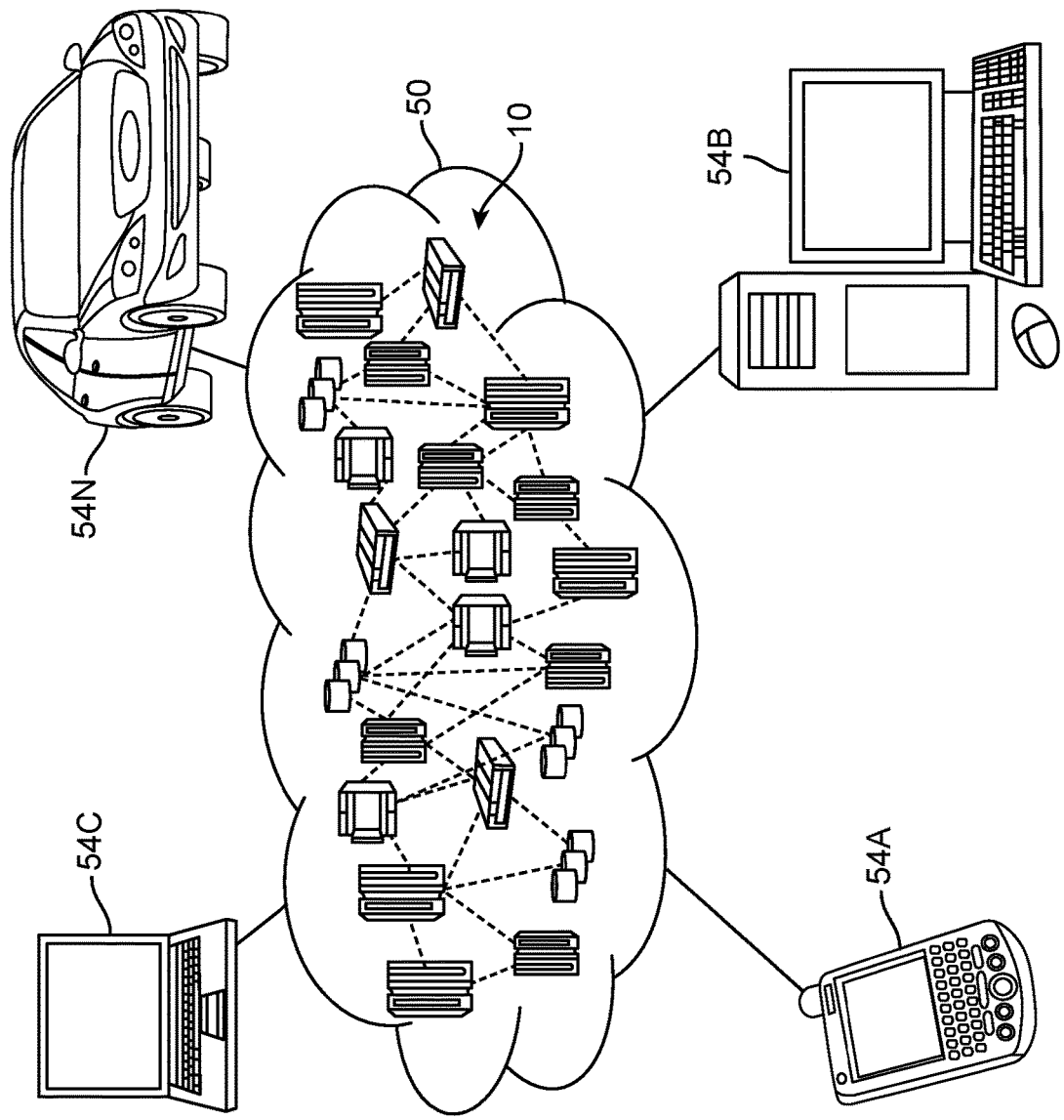
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
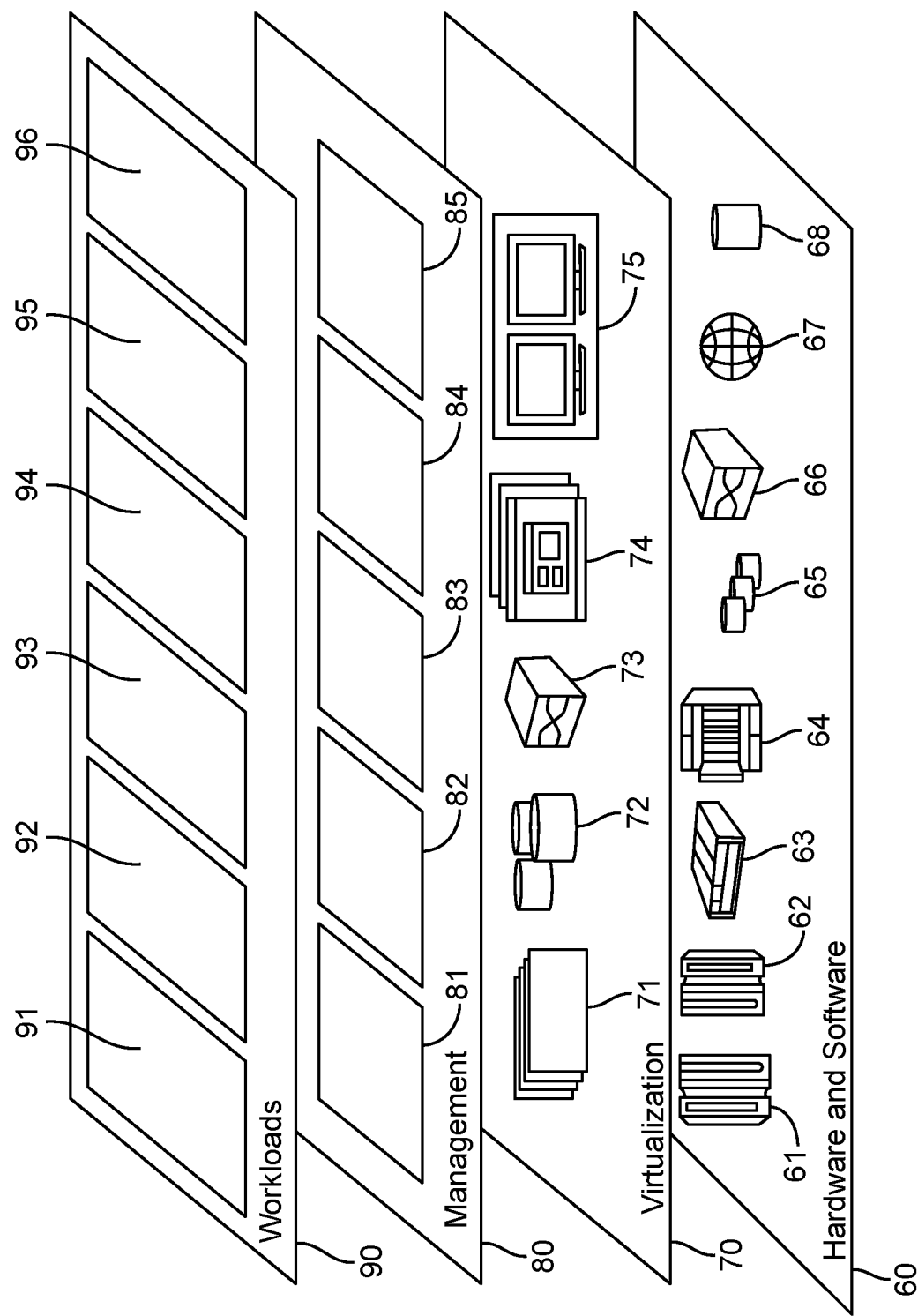
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for automated abstractive information technology (IT) summary generation, the computer-implemented method being executed by one or more processors and comprising:

arranging a primary computer system in communication with multiple secondary computer systems via a network, each of the multiple secondary computer systems comprising a computer system configured to manage an IT environment of a client and a ticket repository;

receiving, by the primary computer system via the network, numerous IT records, each one of the numerous IT records comprising text and numerical data from the ticket repository of one of the secondary computer systems;

normalizing, by the primary computer system for each one of the numerous IT records, the numerical data into normalized numerical data;

transforming, by the primary computer system for each one of the numerous IT records, the normalized numerical data into comparative and superlative adjectival terms; and rewriting, by the primary computer system for each one of the numerous IT records, the text to include the comparative and superlative adjectival terms for output as a rewritten IT record;

generating, by the primary computer system for the client of the one of the secondary computer systems, a summary report of the output as the rewritten IT record for each of the numerous IT records, wherein the one or more processors use at least one of artificial intelligence (AI) and machine learning (ML) to execute at least the normalizing, the transforming and the rewriting.

2. The computer-implemented method according to claim 1, wherein:

the computer-implemented method further comprises performing sentiment analysis on the text of the IT record, and the rewriting of the text comprises accounting for results of the sentiment analysis.

3. The computer-implemented method according to claim 2, wherein the performing of the sentiment analysis comprises:
preprocessing of the text into tokenized text by removing irrelevant information, special characters and stopwords;
analyzing the tokenized text to determine a sentiment associated with each phrase in the tokenized text; and
aggregating the sentiment associated with each phrase in the tokenized text to determine an overall sentiment of the text.

4. The computer-implemented method according to claim 2, further comprising performing a coreference resolution with respect to the rewritten IT record to generate a summary report to be output,
wherein the performing of the coreference resolution comprises:
receiving an input of text of the rewritten IT record;
tokenizing of the text of the rewritten IT record;
applying a coreference resolution model to identify and link words and phrases in the rewritten IT record that refer to a same entity; and
outputting indications of the words and phrases in the rewritten IT record that refer to the same entity so that the summary report can include those indications.

5. The computer-implemented method according to claim 4, wherein the one or more processors use the at least one of the AI and the ML to execute the performing of the sentiment analysis and the performing of the coreference resolution.

6. The computer-implemented method according to claim 1, wherein:
the normalizing comprises min-max scaling, z-score standardization and decimal scaling, and
in normalization by min-max scaling, values are scaled to a fixed range and a scaled_value=(value−min_value)/(max_value−min_value) ensuring that a minimum value in a dataset is mapped to 0 and a maximum value in the dataset is mapped to 1 and preserving relative differences between other values,
in normalization by z-score standardization, z-score standardization transforms values by subtracting a mean and dividing by a standard deviation and z-score=(value−mean)/standard_deviation ensuring that standardized values have a mean of 0 and a standard deviation of 1 and allowing for comparisons based on a number of standard deviations a value is away from the mean, and,
in normalization by decimal scaling, a decimal point of values is shifted to create new scaled values where a scaling factor is determined by a largest absolute value among a dataset and a scaled_value=value/(10^scaling_factor) resulting in values with a reduced range.

7. The computer-implemented method according to claim 1, wherein the transforming comprises;
threshold-based comparing in which thresholds or ranges are set based on normalized or scaled values and comparative or superlative adjectives are assigned accordingly;
relative comparing in which the normalized or scaled values are compared with a reference point or benchmark; and
mapping to predefined categories in which the normalized or scaled values are mapped to predefined categories or adjective levels.

8. A system comprising:
a memory having computer readable instructions; and
one or more processors for executing the computer readable instructions, the computer readable instructions controlling the one or more processors to perform operations for automated abstractive information technology (IT) summary generation comprising:
arranging a primary computer system in communication with multiple secondary computer systems via a network, each of the multiple secondary computer systems comprising a computer system configured to manage an IT environment of a client and a ticket repository;
receiving, by the primary computer system via the network, numerous IT records, each one of the numerous IT records comprising text and numerical data from the ticket repository of one of the secondary computer systems;
normalizing, by the primary computer system for each one of the numerous IT records, the numerical data into normalized numerical data;
transforming, by the primary computer system for each one of the numerous IT records, the normalized numerical data into comparative and superlative adjectival terms; and
rewriting, by the primary computer system for each one of the numerous IT records, the text to include the comparative and superlative adjectival terms for output as a rewritten IT record;
generating, by the primary computer system for the client of the one of the secondary computer systems, a summary report of the output as the rewritten IT record for each of the numerous IT records,
wherein the one or more processors use at least one of artificial intelligence (AI) and machine learning (ML) to execute at least the normalizing, the transforming and the rewriting.

9. The system according to claim 8, wherein:
the operations further comprise performing sentiment analysis on the text of the IT record, and
the rewriting of the text comprises accounting for results of the sentiment analysis.

10. The system according to claim 9, wherein the performing of the sentiment analysis comprises:
preprocessing of the text into tokenized text by removing irrelevant information, special characters and stopwords;
analyzing the tokenized text to determine a sentiment associated with each phrase in the tokenized text; and
aggregating the sentiment associated with each phrase in the tokenized text to determine an overall sentiment of the text.

11. The system according to claim 9, wherein the operations further comprise performing a coreference resolution with respect to the rewritten IT record to generate a summary report to be output,
wherein the performing of the coreference resolution comprises:
receiving an input of text of the rewritten IT record;
tokenizing of the text of the rewritten IT record;
applying a coreference resolution model to identify and link words and phrases in the rewritten IT record that refer to a same entity; and
outputting indications of the words and phrases in the rewritten IT record that refer to the same entity so that the summary report can include those indications.

12. The system according to claim 11, wherein the one or more processors use the at least one of the AI and the ML to execute the performing of the sentiment analysis and the performing of the coreference resolution.

13. The system according to claim 8, wherein:
the normalizing comprises min-max scaling, z-score standardization and decimal scaling, and
in normalization by min-max scaling, values are scaled to a fixed range and a scaled_value=(value−min_value)/(max_value−min_value) ensuring that a minimum value in a dataset is mapped to 0 and a maximum value in the dataset is mapped to 1 and preserving relative differences between other values,
in normalization by z-score standardization, z-score standardization transforms values by subtracting a mean and dividing by a standard deviation and z-score=(value−mean)/standard_deviation ensuring that standardized values have a mean of 0 and a standard deviation of 1 and allowing for comparisons based on a number of standard deviations a value is away from the mean, and,
in normalization by decimal scaling, a decimal point of values is shifted to create new scaled values where a scaling factor is determined by a largest absolute value among a dataset and a scaled_value=value/(10^scaling_factor) resulting in values with a reduced range.

14. The system according to claim 8, wherein the transforming comprises:
threshold-based comparing in which thresholds or ranges are set based on normalized or scaled values and comparative or superlative adjectives are assigned accordingly;
relative comparing in which the normalized or scaled values are compared with a reference point or benchmark; and
mapping to predefined categories in which the normalized or scaled values are mapped to predefined categories or adjective levels.

15. A computer program product comprising a computer readable storage medium having program instructions embodied therewith, the program instructions executable by one or more processors to cause the one or more processors to perform operations for automated abstractive information technology (IT) summary generation comprising:
arranging a primary computer system in communication with multiple secondary computer systems via a network, each of the multiple secondary computer systems comprising a computer system configured to manage an IT environment of a client and a ticket repository;
receiving, by the primary computer system via the network, numerous IT records, each one of the numerous IT records comprising text and numerical data from the ticket repository of one of the secondary computer systems;
normalizing, by the primary computer system for each one of the numerous IT records, the numerical data into normalized numerical data;
transforming, by the primary computer system for each one of the numerous IT records, the normalized numerical data into comparative and superlative adjectival terms; and
rewriting, by the primary computer system for each one of the numerous IT records, the text to include the comparative and superlative adjectival terms for output as a rewritten IT record;
generating, by the primary computer system for the client of the one of the secondary computer systems, a summary report of the output as the rewritten IT record for each of the numerous IT records,
wherein the one or more processors use at least one of artificial intelligence (AI) and machine learning (ML) to execute at least the normalizing, the transforming and the rewriting.

16. The computer program product according to claim 15, wherein:
the operations further comprise performing sentiment analysis on the text of the IT record, and
the rewriting of the text comprises accounting for results of the sentiment analysis.

17. The computer program product according to claim 16, wherein the performing of the sentiment analysis comprises:
preprocessing of the text into tokenized text by removing irrelevant information, special characters and stopwords;
analyzing the tokenized text to determine a sentiment associated with each phrase in the tokenized text; and
aggregating the sentiment associated with each phrase in the tokenized text to determine an overall sentiment of the text.

18. The computer program product according to claim 16, wherein the operations further comprise performing a coreference resolution with respect to the rewritten IT record to generate a summary report to be output,
wherein the performing of the coreference resolution comprises:
receiving an input of text of the rewritten IT record;
tokenizing of the text of the rewritten IT record;
applying a coreference resolution model to identify and link words and phrases in the rewritten IT record that refer to a same entity; and
outputting indications of the words and phrases in the rewritten IT record that refer to the same entity so that the summary report can include those indications.

19. The computer program product according to claim 18, wherein the one or more processors use the at least one of the AI and the ML to execute the performing of the sentiment analysis and the performing of the coreference resolution.

20. The computer program product according to claim 15, wherein:
the normalizing comprises min-max scaling, z-score standardization and decimal scaling, and
in normalization by min-max scaling, values are scaled to a fixed range and a scaled_value=(value−min_value)/(max_value−min_value) ensuring that a minimum value in a dataset is mapped to 0 and a maximum value in the dataset is mapped to 1 and preserving relative differences between other values,
in normalization by z-score standardization, z-score standardization transforms values by subtracting a mean and dividing by a standard deviation and z-score=(value−mean)/standard_deviation ensuring that standardized values have a mean of 0 and a standard deviation of 1 and allowing for comparisons based on a number of standard deviations a value is away from the mean, and,
in normalization by decimal scaling, a decimal point of values is shifted to create new scaled values where a scaling factor is determined by a largest absolute value among a dataset and a scaled_value=value/(10^scaling_factor) resulting in values with a reduced range.

21. The computer program product according to claim 15, wherein the transforming comprises:

threshold-based comparing in which thresholds or ranges are set based on normalized or scaled values and comparative or superlative adjectives are assigned accordingly;

relative comparing in which the normalized or scaled values are compared with a reference point or benchmark; and mapping to predefined categories in which the normalized or scaled values are mapped to predefined categories or adjective levels.

* * * * *